Patented Dec. 6, 1938

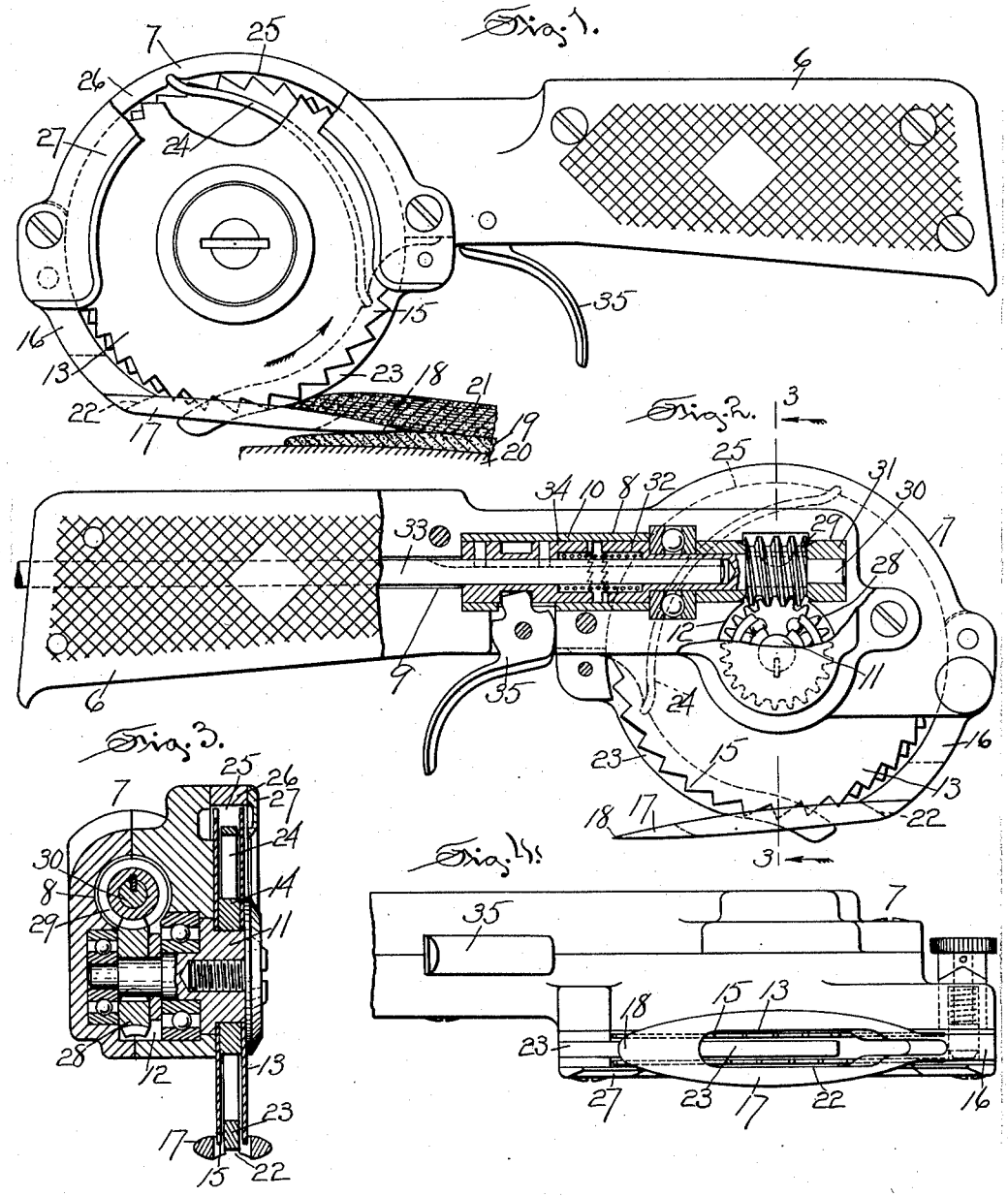

2,139,272

UNITED STATES PATENT OFFICE 2,139,272

SAW FOR REMOVING PLASTER CASTS

Charles N. Jaworski, Hartford, Conn.

Application August 4, 1936, Serial No. 94,159

5 Claims. (Cl. 128—317)

My invention relates to the class of surgeon's instruments which are employed for removing plaster casts from the limbs and bodies of patients, and an object of the invention, among others, is the production of an instrument of this type in the use of which such casts may be removed in a particularly efficient manner and with a minimum degree of inconvenience to the patient.

One form of an instrument embodying my invention and in the construction and use of which the objects herein set out, as well as others, may be attained is illustrated in the accompanying drawing in which Figure 1 is a view in side elevation of my improved saw.

Figure 2 is a view partially in lengthwise vertical section through the same.

Figure 3 is a view in cross section on a plane denoted by the dotted line 3—3 of Figure 2.

Figure 4 is a bottom view of that end of the instrument that supports the saw.

In applying plaster casts to the limbs and bodies of patients a layer of cotton is placed next to the skin and the plaster cast overlies and surrounds this cotton layer. Saws have heretofore been provided for cutting away this plaster cast which is hard and dry, but a difficulty in the use of such saws is that the cotton layer next to the skin is caught by the teeth of the saw and the cutting action of the latter is therefore impeded or prevented.

My improved saw illustrated and described herein is provided with means for preventing the saw from coming in contact with this cotton layer with a result that the objections met in a tool wherein the saw comes in contact with such cotton layer are avoided, in the accompanying drawing the numeral 6 denoting the stock and 7 the head of my improved tool. The stock and head are preferably formed in two parts of similar shape and construction divided on a vertical lengthwise central plane. Complemental portions of a chamber 8 are formed in each of the members, and a hole 9 extends from said chamber out at the end of the handle or stock 6. A sleeve 10 is located in said chamber to receive driving mechanism to be hereinafter described.

A saw supporting shaft 11 is rotatably mounted in the members of the head, said shaft extending across a gear chamber 12 underlying and in communication with the chamber 8 hereinbefore described. A saw is secured to the shaft 11 and this saw is of peculiar construction in that it is composed of two members 13 of similar construction and spaced apart and held in spaced relation as by means of a spacer 14. The teeth 15 of the saws slant in the direction of rotation and this is a particular feature of my invention, the saw rotating in the direction indicated by the arrow in Figure 1, and in use the tool is pulled into engagement with the material of the plaster cast rather than being pushed into such engagement.

A separator is secured to the outer end of the head 7 as by means of a shank 16 extending into a recess in the head and held therein as by means of a screw and pin, as shown in Figs. 1 and 2 of the drawing. This separator also comprises a shoe 17 extending from the shank backwardly, this term being used with the understanding that the head is at the front end of the tool. This shoe is of somewhat oval shape in plan view, as shown in Fig. 4 of the drawing, and has a flattened sharpened toe 18 that, in the use of the tool, is adapted to enter between the layer of cotton 19 that is wrapped next to the flesh 20 and the material 21 comprising the cast.

From this it will be seen that the point or toe of the shoe separates the cotton layer from the body of the plaster cast and prevents contact thereof with the saw.

An opening 22 is formed through the shoe for the reception of the lower end of a presser lever 23 that is pivotally supported in the back portion of the head adjacent to the handle or stock and as shown in Figs. 1 and 2 of the drawing. This presser lever projects along the space between the two saws and through the opening 22 in the shoe 17, and as shown in Figs. 1 and 4 of the drawing. The saw teeth also project partially through the opening 22, and it is here remarked that the teeth of the saw members are located in staggered relation one with respect to the other, and as shown in Fig. 1 of the drawing. A spring 24 of bowed form has one end entered in a notch of the lever and its opposite end entered in a notch in the wall of a recess 25 formed in the side of the head, and as shown in Fig. 1 of the drawing. In the structure herein shown this recess is formed by the segment 26 of a ring secured to that side of the head on which the saw is located and a semicircular plate 27, which plate and ring are secured to the side of the head as by means of screws, and as shown in Fig. 1 of the drawing. The two parts of the stock and head are also secured together as by means of screws, and as shown in Figure 1.

As a means for rotating the saw a worm wheel 28 is secured to the shaft 11 and is engaged with a worm 29 secured to a shaft 30 rotatably mounted in bushings 31 secured in the chamber

8, and as shown in Figure 2 of the drawing. The shaft 30 is enlarged at its end to form a clutch member 32, this end of the shaft being bored and counter-bored. A driving shaft 33 extends through the stock or handle from the end thereof and into the bore in the shaft 30. A clutch member 34 is rotatably mounted in the chamber 8 in position to engage its companion clutch member 32, said shaft 33 extending through this clutch member 34. Springs within the clutch members force them apart and ball bearings suitably disposed are provided for the saw shaft 11, as shown in Figure 3, and for the thrust of the clutch members 32 and 34, as shown in Figure 2. The clutch member 34 is splined to the shaft 33 and a finger lever 35 is pivotally mounted in the under side of the stock for engagement by the finger of the operator, this lever being loosely engaged with the clutch member 34 as a means for engaging it with its companion clutch member 32.

The shaft 33 extends through to the outer end of the stock or handle 6 and it may be provided with any suitable coupling means (not shown herein) for connection to a flexible shaft or other means for driving it, it being understood that any suitable means for driving the shaft may be employed.

The operation of the tool will be readily understood from the foregoing description it being noted that the stock or handle being grasped by the operator the point 18 of the shoe 17 is engaged underneath the material 21 of the plaster cast and between such material and the cotton layer 19. The finger lever 35 being pulled the clutch members will be engaged and the driving shaft 33 being in operation the saws will be rotated to cut slots in the material 21. Such material between the saws will be pressed by the presser lever 23 through the opening 22 in the shoe 17, said presser lever yielding to the pressure of such material as conditions may impose. The flesh of the patient is protected from engagement with the teeth of the saw by reason of the fact that such teeth are located within the opening in the shoe 17 without any liability of coming in contact with such flesh. In fact as the operation proceeds a single slot of the width of the two saws will be cut in the plaster cast.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim:
1. A saw for removing plaster casts, said saw including a support, a pair of saws spaced apart and rotatably mounted in said support, a shoe projecting from said support along the peripheries of said saws, a presser lever extending from said support between the saws along the peripheries thereof to clear the space between them and adapted to be positioned with its end below the upper surface of said shoe, and means for rotating said saws.

2. A saw for removing plaster casts, said saw including a support, a pair of saws spaced apart and rotatably mounted in said support, a shoe projecting from said support along the peripheries of said saws, said shoe having an opening therethrough, a presser lever pivotally mounted in said support and extending downwardly between the saws and through the opening in said shoe, and means for rotating said saws.

3. A saw for removing plaster casts, said saw including a support, a pair of saws rotatably mounted in said support, a shoe member secured to and projecting from said support, and a presser member pivotally mounted in said support and extending downwardly between said saws to clear the space between them and with its outer end in cooperative relation to said shoe and projecting through the opening therein.

4. A saw for removing plaster casts, said saw including a stock and a head rigidly connected, a gear chamber within said saw, a hole extending through said stock, a driving shaft extending along said hole, gear driving members operatively connected within said gear chamber, a recess formed on one side of said head, a pair of saws rotatably mounted in said recess and operatively connected with said gears, a shoe extending downwardly from said head along the periphery of said saws and having an opening to receive the teeth thereof, and a presser lever pivotally mounted in said stock and projecting downwardly with its lower end in cooperative engagement with said shoe.

5. A saw for removing plaster casts, said saw including a support, a saw member rotatably mounted in said support and a presser foot member projecting from said support, one of said members being formed to lie on opposite sides of the other member at the periphery of the saw member, and a shoe projecting from said support along the periphery of said saw member in cooperative relation to said saw and presser foot members, said presser foot being adapted to extend below the upper surface of said shoe.

CHARLES N. JAWORSKI.